US008831372B2

(12) United States Patent
Akiyama (10) Patent No.: US 8,831,372 B2
(45) Date of Patent: Sep. 9, 2014

(54) IMAGE PROCESSING DEVICE, IMAGE PROCESSING METHOD AND STORAGE MEDIUM STORING IMAGE PROCESSING PROGRAM

(75) Inventor: Naoyuki Akiyama, Shibuya-ku (JP)

(73) Assignee: Olympus Corporation, Tokyo (JP)

( * ) Notice: Subject to any disclaimer, the term of this patent is extended or adjusted under 35 U.S.C. 154(b) by 386 days.

(21) Appl. No.: 13/247,353

(22) Filed: Sep. 28, 2011

(65) Prior Publication Data

US 2012/0093432 A1    Apr. 19, 2012

(30) Foreign Application Priority Data

Oct. 13, 2010    (JP) ................................. 2010-230949

(51) Int. Cl.
*G06K 9/40* (2006.01)
*G06K 9/32* (2006.01)
*G06T 5/00* (2006.01)

(52) U.S. Cl.
CPC ....... *G06T 5/002* (2013.01); *G06T 2207/20192* (2013.01); *G06T 2207/20016* (2013.01)
USPC ........... 382/261; 382/262; 382/266; 382/298; 382/299

(58) Field of Classification Search
None
See application file for complete search history.

(56) References Cited

U.S. PATENT DOCUMENTS

| | | | | |
|---|---|---|---|---|
| 5,799,113 A * | 8/1998 | Lee | ............................... | 382/256 |
| 6,307,569 B1 * | 10/2001 | Ratakonda | .................... | 345/671 |
| 7,200,278 B2 * | 4/2007 | Long et al. | .................... | 382/266 |
| 7,317,552 B2 * | 1/2008 | Sumiuchi | ....................... | 358/1.2 |
| 7,355,610 B2 * | 4/2008 | Soroushi | ....................... | 345/667 |
| 7,885,486 B2 * | 2/2011 | Kubota et al. | ................. | 382/298 |
| 8,358,868 B2 * | 1/2013 | Iketani | ........................... | 382/267 |
| 8,693,809 B2 * | 4/2014 | Yu et al. | ........................ | 382/298 |
| 2006/0039590 A1 * | 2/2006 | Lachine et al. | ............... | 382/128 |
| 2007/0133902 A1 * | 6/2007 | Kumar | ........................... | 382/298 |
| 2007/0153335 A1 * | 7/2007 | Hosaka | .......................... | 358/463 |
| 2009/0135243 A1 * | 5/2009 | Yamazaki | ..................... | 347/254 |
| 2009/0154841 A1 * | 6/2009 | Choi et al. | .................... | 382/307 |

OTHER PUBLICATIONS

E. Land et al; Lightness and Retinex Theoy; Journal of the Optical Society of America; vol. 61, No. 1, pp. 1-11; Jan. 1971.
F. Durand et al; Fast Bilateral Filtering for the Display of High-Dynamic-Range Images; pp. 1-2; Laboratory for Computer Science, Mass. Institute of Technology.
J. Kuang et al; iCAM06: A Refined Image Appearance Model for HDR Image Rendering; pp. 407-415; Nov. 15, 2006.

* cited by examiner

*Primary Examiner* — Michelle Entezari
(74) *Attorney, Agent, or Firm* — Holtz Holtz Goodman & Chick PC (57) ABSTRACT

An image processing device for performing edge-preserving smoothing includes a reducing unit for reducing an input image; a reduced image smoothing unit for performing a smoothing processing on a reduced image generated by the reducing unit with edges preserved; and an edge-preserving enlarging unit for enlarging an image generated by the reduced image smoothing unit with the edges preserved. The edge-preserving enlarging unit performs a filtering processing by determining a pixel value of a target pixel for the filtering processing based on weighted addition of pixel values of respective reference pixels. Weighting coefficients for the pixel values of the respective reference pixels is set based on differences between a pixel value of the input image corresponding to the target pixel and pixel values of the respective reference pixels and based on distances between the target pixel and the respective reference pixels.

10 Claims, 9 Drawing Sheets

IMAGE PROCESSING DEVICE, IMAGE PROCESSING METHOD AND STORAGE MEDIUM STORING IMAGE PROCESSING PROGRAM

FIELD OF THE INVENTION

The present invention relates to an image processing device, an image processing program and an image processing method.

BACKGROUND OF THE INVENTION

The Retinex theory on a model of human visual perception conventionally used in performing a gradation correction processing and the like, is disclosed in E H Land and J J McCann, "lightness and retinex theory," *J. Opt. Soc. Am.* 61, 1 (1971). Based on the retinex theory, an image is separated into an illumination component and a reflectance component and a gradation correction processing is performed only on the illumination component (see, for example, Kuang, J., Johnson, G. M., Fairchild M. D. "iCAM06: A refined image appearance model for HDR image rendering," *Journal of Visual Communication and Image Representation*, Volume 18, Issue 5, October 2007, Pages 406-414). In this way, a visually good processed image is obtained.

Here, the gradation correction processing is a conversion for narrowing a dynamic range of an image or adjusting the brightness of a dark section and a bright section. The illumination component is a component image largely influenced by illumination light and the reflectance component is a component image largely influenced by the reflectance of a subject. Further, in performing a texture correction processing, a visually good processed image is obtained if the correction processing is performed only on the separated reflectance component. These correction processings may be simultaneously performed on the respective components of one image.

If the illumination component is not appropriately obtained particularly in an area adjacent to an edge in generating an illumination component image described in the Retinex theory, a halo artifact appears in an area adjacent to an edge of an image after the gradation correction. To solve this problem, it is necessary to use a nonlinear filter (e.g. bilateral filter) for performing smoothing in areas other than edges while preserving the edges such as the outline of an object and widen a reference pixel range of the filter. Thus, a huge amount of computation is necessary to generate the illumination component image.

Accordingly, a fast computational technique such as fast bilateral filtering has been, for example, proposed. The fast bilateral filtering is disclosed in the following literature: "*Fast Bilateral Filtering for the Display of High-Dynamic-Range Images*" written by Fredo Durand and Julie Dorsey, SIGGRAPH 2002.

SUMMARY OF THE INVENTION

An image processing device according to one aspect of this invention comprises: a reducing unit (or reducing means) for reducing an input image; a reduced image smoothing unit (or reduced image smoothing means) for performing a smoothing processing on a reduced image generated by the reducing unit with edges preserved; and an edge-preserving enlarging unit (edge-preserving enlarging means) for enlarging an image generated by the reduced image smoothing unit with the edges preserved. The edge-preserving enlarging unit performs a filtering processing after enlargement, by determining a pixel value of a target pixel for the filtering processing based on weighted addition of pixel values of respective reference pixels. The edge-preserving enlarging unit sets weighting coefficients for the pixel values of the respective reference pixels, based on differences between a pixel value of the input image corresponding to the target pixel and pixel values of the respective reference pixels and based on distances between the target pixel and the respective reference pixels.

An image processing method for performing edge-preserving smoothing according to another aspect of this invention comprises: a reducing step of reducing an input image; a reduced image smoothing step of performing a smoothing processing on a reduced image generated in the reducing step with edges preserved; and an edge-preserving enlarging step of enlarging an image generated in the reduced image smoothing step with the edges preserved. The edge-preserving enlarging step includes performing a filtering processing after enlargement, by determining a pixel value of a target pixel for the filtering processing based on weighted addition of pixel values of respective reference pixels. In the weighted addition, weighting coefficients are set for the pixel values of the respective reference pixels, based on differences between a pixel value of the input image corresponding to the target pixel and pixel values of the respective reference pixels and based on distances between the target pixel and the respective reference pixels.

A non-transitory computer-readable storage device according to still another aspect of this invention stores an image processing program for performing edge-preserving smoothing by a computer. The image processing program causes the computer to perform: a reducing procedure for reducing an input image; a reduced image smoothing procedure for performing a smoothing processing on a reduced image generated by the reducing procedure with edges preserved; and an edge-preserving enlarging procedure for enlarging an image generated by the reduced image smoothing procedure with the edges preserved. The edge-preserving enlarging procedure includes performing a filtering processing after enlargement, by determining a pixel value of a target pixel for the filtering processing based on weighted addition of pixel values of respective reference pixels. In the weighted addition, weighting coefficients are set for the pixel values of the respective reference pixels, based on differences between a pixel value of the input image corresponding to the target pixel and pixel values of the respective reference pixels and based on distances between the target pixel and the respective reference pixels.

The details as well as other features and advantages of this invention are set forth in the remainder of the specification and are shown in the accompanying drawings.

DESCRIPTION OF THE PREFERRED EMBODIMENTS

First Embodiment

Figure 1:
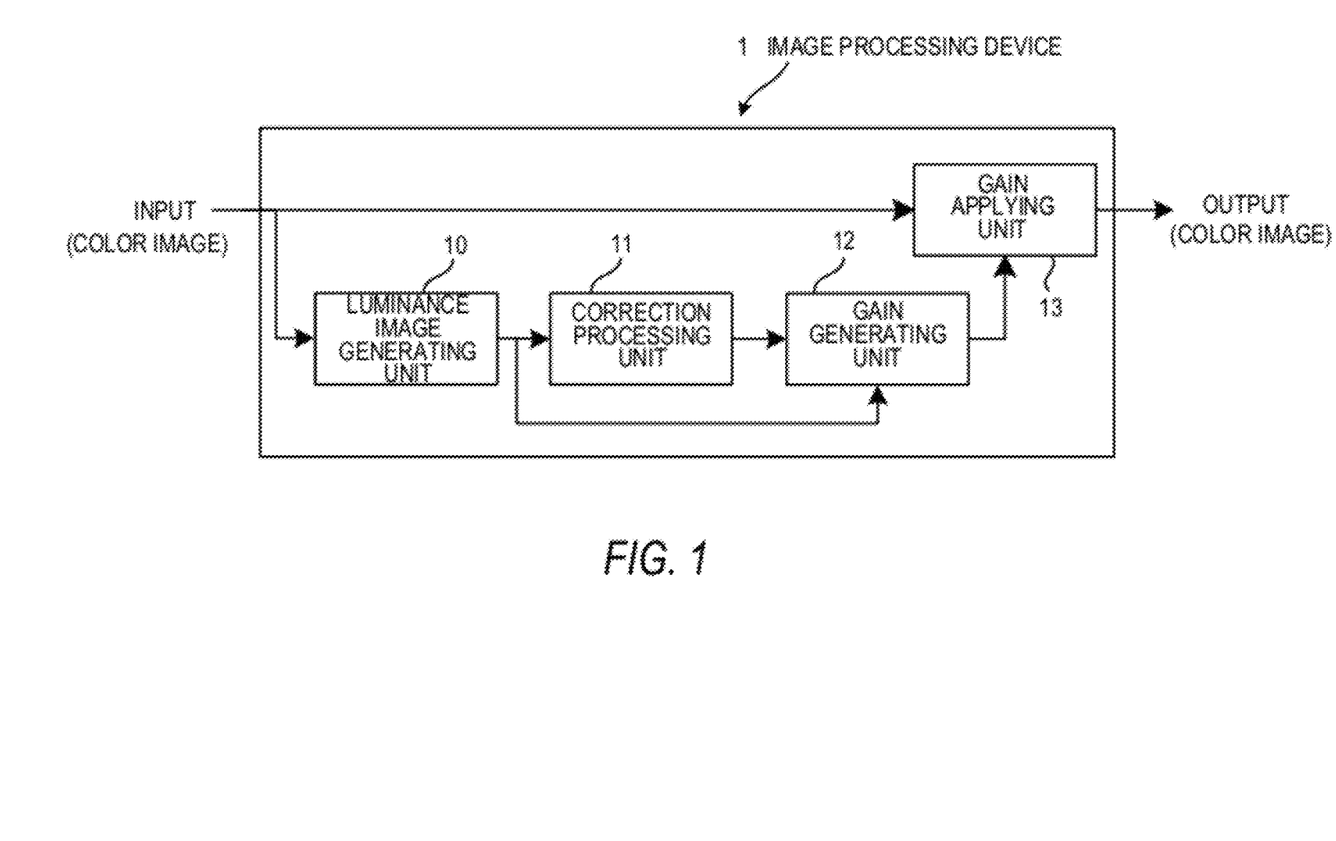
FIG. 1 is a block diagram showing an image processing device according to a first embodiment.

FIG. 1 is a block diagram of an image processing device 1 (or image processing system) according to a first embodiment. The image processing device 1 is mounted in an electronic apparatus. Examples of the electronic equipment include a television receiver, a printer, a still camera, a video camera and the like. The image processing device 1 includes a part for performing an edge-preserving smoothing processing on an image (edge-preserving smoothing unit 20 to be described later). An edge-preserving smoothing processing is equivalent to a processing of generating an illumination component image including an illumination component based on the Retinex theory.

The image processing device 1 performs a gradation correction processing and a texture correction processing on an input color image (e.g. RGB image). The image processing device 1 includes a luminance image generating unit 10, a correction processing unit 11, a gain generating unit 12 and a gain applying unit 13. For example, the respective units 10 to 13 may be composed of logic circuits or may be composed of a CPU (central processing unit) and a memory storing a computation program.

The luminance image generating unit 10 converts a color image into a luminance image. The luminance image generating unit 10 obtains a luminance (or brightness) value (Y) for each pixel, for example, by RGB-YIQ conversion, and generates a luminance image including the luminance values (Y) as pixel values. The correction processing unit 11 performs the gradation correction processing and the texture correction processing on the luminance image generated from the color image. The gain generating unit 12 generates gains used for gradation conversions of the respective colors of the color image. For example, the gain generating unit 12 sets a gain of each color of the color image to a ratio of luminance values at each pixel between an image after the processing by the correction processing unit 11 and an image before the processing. The gain applying unit 13 applies the gains generated by the gain generating unit 12 to gradation conversion of the respective colors of the color image and applies the gains to the pixel values of the input color image.

Figure 2:
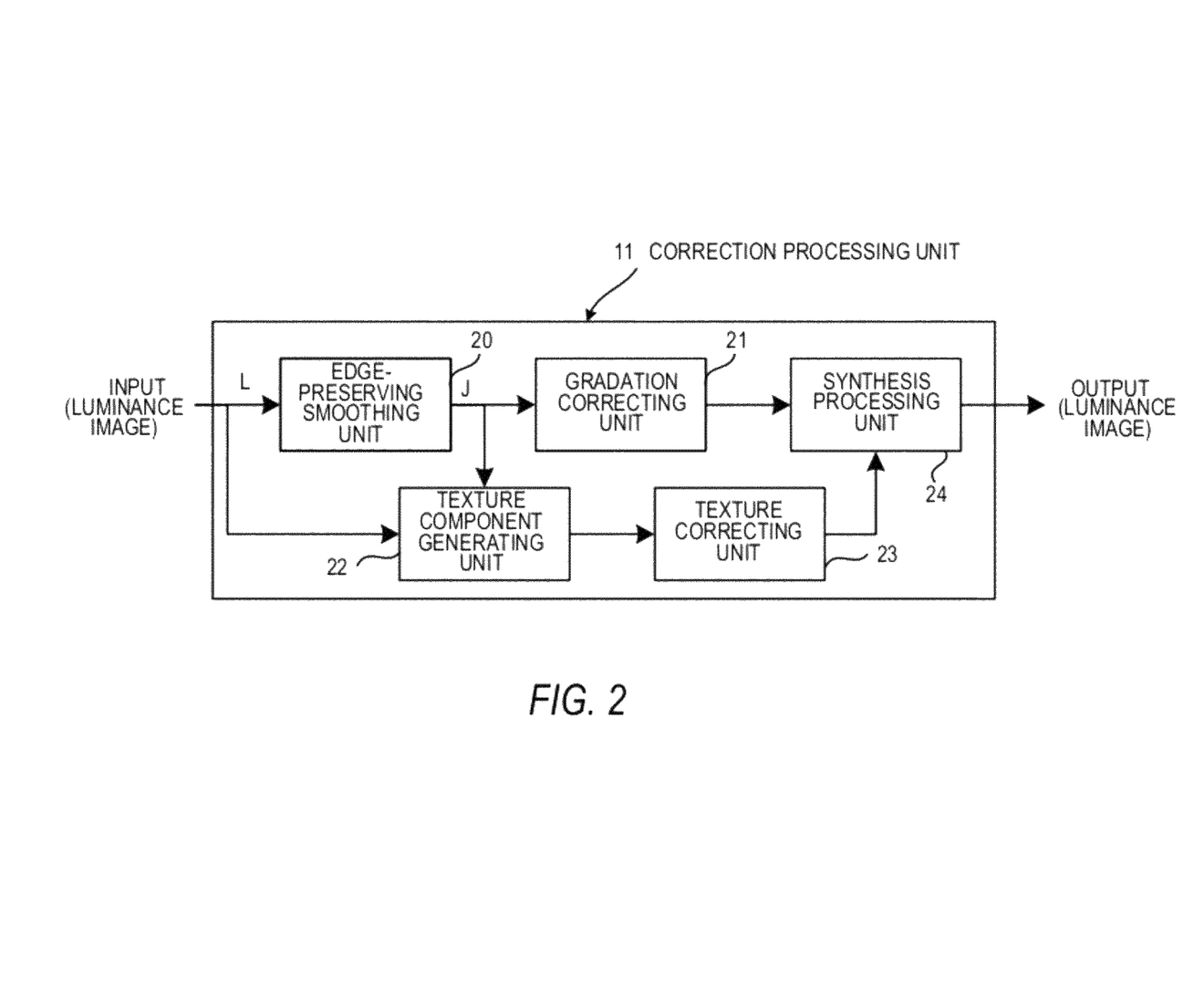
FIG. 2 is a block diagram showing details of a correction processing unit according to the first embodiment.

FIG. 2 is a block diagram showing details of the above correction processing unit 11. The correction processing unit 11 includes the edge-preserving smoothing unit 20, a gradation correcting unit 21, a texture component generating unit 22, a texture correcting unit 23 and a combining processing unit 24. For example, the respective units 20 to 24 may be composed of logic circuits or may be composed of a CPU (central processing unit) and a memory storing a computation program.

The edge-preserving smoothing unit 20 generates a smoothed image J with preserved edges by performing edge-preserving smoothing on the luminance image input from the luminance image generating unit 10. Note that the smoothed image J is equivalent to an illumination component. The gradation correcting unit 21 performs the gradation correction processing on the smoothed image J. The gradation correction processing adopts a method for converting luminance values of pixels by an already known gamma curve, a method using histogram smoothing or the like.

The texture component generating unit 22 generates a texture component image by calculating differences or ratios between luminance values (pixel values) of the pixels of the smoothed image J and an input luminance image L. Note that the texture component image is equivalent to a reflectance component. The texture correcting unit 23 performs a texture correction on the texture component image using, for example, a method for multiplying or exponentiating of a given number. The combining processing unit 24 combines a gradation-corrected image and a texture-corrected image generated in the gradation correcting unit 21 and the texture correcting unit 23. An output image from the combining processing unit 24 is a luminance image having the gradation correction and the texture correction performed thereon.

Although a case where the correction processing unit 11 performs both the gradation correction processing and the texture correction processing has been described above, the correction processing unit 11 may perform only either one of these processings.

Figure 3:
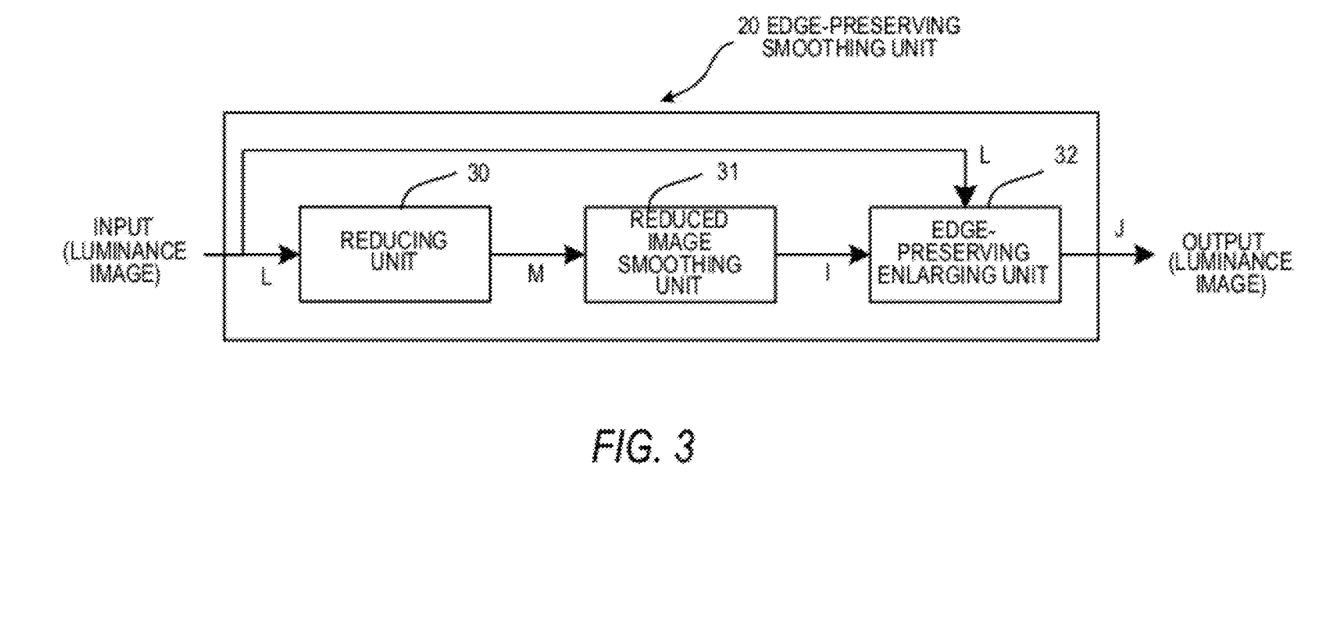
FIG. 3 is a block diagram showing details of an edge-preserving smoothing unit according to the first embodiment.

FIG. 3 is a block diagram showing details of the edge-preserving smoothing unit 20 as a characteristic part of this embodiment.

The edge-preserving smoothing unit 20 includes a reducing unit 30, a reduced image smoothing unit 31 and an edge-preserving enlarging unit 32. For example, the respective units 30 to 32 may be composed of logic circuits or may be composed of a CPU (central processing unit) and a memory storing a computation program. The reducing unit 30, the reduced image smoothing unit 31 and the edge-preserving enlarging unit 32 are respectively equivalent to reducing means, reduced image smoothing means and edge-preserving enlarging means.

The reducing unit 30 performs a reduction processing of reducing the luminance image L from the luminance image generating unit 10 at a predetermined reduction ratio. An example of the reduction processing is pixel thinning. In the case of performing only pixel thinning as the reduction processing, a computation amount is small.

The reduced image smoothing unit 31 performs the edge-preserving smoothing processing on the image reduced in the reducing unit 30 (reduced image M). The edge-preserving smoothing processing is a processing of smoothing an image with the edges preserved. An example of this edge-preserving smoothing processing is a processing using a known bilateral filter as an edge-preserving smoothing filter.

The edge-preserving enlarging unit 32 performs an enlargement processing of enlarging the image (reduced smoothed image I) obtained in the reduced image smoothing unit 31. This enlargement processing enlarges the reduced smoothed image while preserving the edges. An enlargement magnification can be an inverse of the above reduction ratio and, in this case, the size of an image (enlarged image) J after the enlargement is the same as that of the input luminance image L. If the reduction ratio is, for example, ¼, the enlargement ratio may be 4-fold.

A computation amount to obtain the illumination component can be reduced by performing the edge-preserving smoothing with the luminance image reduced. Here, the illumination component is the smoothed image J output from the edge-preserving enlarging unit 32.

Next, a preferable enlargement processing performed by the edge-preserving enlarging unit 32 is described. Note that the enlargement processing includes interpolation after the image enlargement. The edge-preserving enlarging unit 32 enlarges the reduced smoothed image I while preserving the edges. In an interpolation processing of the edge-preserving enlarging unit 32, an edge-preserving smoothing filter similar to a bilateral filter is applied. If the enlargement processing uses interpolation by a conventionally known bilinear method, bicubic method or the like, edges in an original image collapse after the enlargement processing.

Here is described a difference between the edge-preserving smoothing filter of the edge-preserving enlarging unit 32 and the bilateral filter. A normal bilateral filter performs calculation for an image I to be filtered as in Equations (1), (2) and generates a resultant image J of the filtering processing.

$$J_s = \frac{1}{k(s)} \sum_{p \in \Omega} f(p-s) g(I_p - I_s) I_p \quad (1)$$

$$k(s) = \sum_{p \in \Omega} f(p-s) g(I_p - I_s) \quad (2)$$

Here, s denotes a target pixel (i.e. pixel to be filtered) and $\Omega$ denotes a filter range. The filter range is a range where reference pixels used for the filtering processing are present. $k(s)$ denotes a normalized value of the filtering result at the target pixel s, i.e. a total value of coefficients $f \cdot g$ on the respective reference pixels p in the filter range. Further, a first function $f$ and a second function g are functions for calculating coefficient values on the respective reference pixels p. The first function $f$ gives the coefficient value dependent on a distance between the target pixel s and the reference pixel p, and the second function g gives a coefficient value dependent on a difference between a pixel value Is of the target pixel s and a pixel value Ip of the reference pixel p. The first function $f$ and the second function g are normally Gaussian functions respectively having different standard deviations σ.

In the bilateral filtering processing, differences between the pixel value Is of the target pixel and the pixel values Ip of the reference pixels are calculated. However, in the enlargement processing including pixel interpolation, the pixel value Is of the target pixel s in an enlarged image before interpolation does not exist in most cases since it is a pixel value at a pixel position to be interpolated. Accordingly, the bilateral filtering processing cannot be normally used for interpolation in the enlargement processing.

However, in this embodiment, the bilateral filtering processing is performed, using a pixel value Ls of a pixel corresponding to the position of the target pixel s in the luminance image L before being reduced to the reduced image M instead of Is, in the interpolation in the enlargement processing of the edge-preserving enlarging unit 32. That is, the edge-preserving enlarging unit 32 performs the enlargement processing while preserving the edges, using interpolation by an edge-preserving smoothing filter expressed by Equations (3A), (3B), and obtains pixel values Js of the enlarged image J.

$$J_s = \frac{1}{k(s)} \sum_{p \in \Omega 1} f(p-s) g(I_p - L_s) I_p \quad (3A)$$

$$k(s) = \sum_{p \in \Omega 1} f(p-s) g(I_p - L_s) \quad (3B)$$

Equations (3A), (3B) showing the enlargement processing are applied to the pixels in a position range $\Omega 1$ (filter range) around the target pixel s desired to be interpolated in the reduced smoothed image I enlarged before the interpolation. For example, the position range $\Omega 1$ of the reference pixels p is an enlargement of 4×4 pixels corresponding to the surrounding of the target pixel s in the image desired to be enlarged and interpolated (namely, reduced smoothed image I). In this case, the position range $\Omega 1$ corresponds to an area shown by hatching in an image of FIG. 4.

Figure 4:
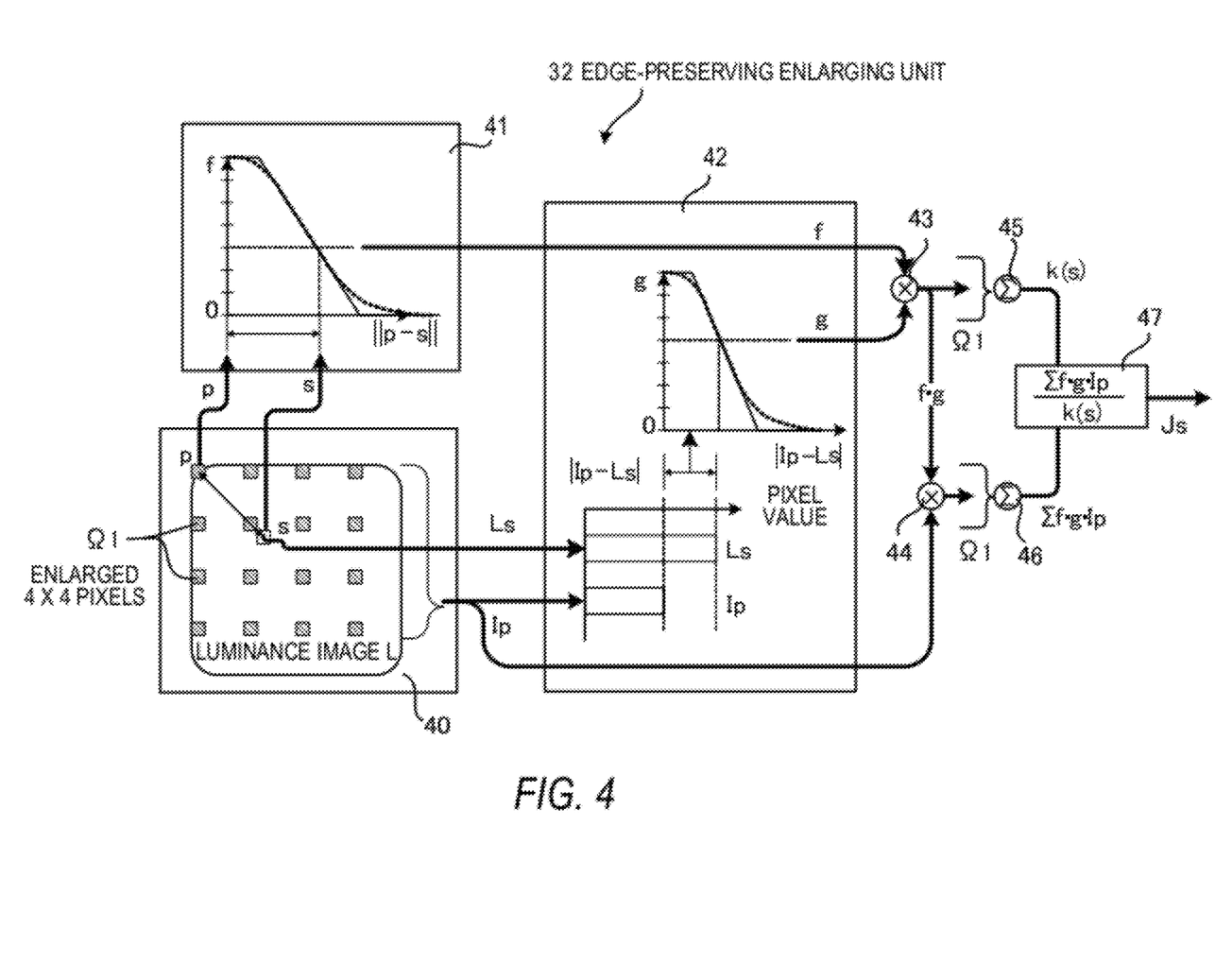
FIG. 4 is a functional block diagram of an edge-preserving enlarging unit according to the first embodiment.

A weighting coefficient with regard to each reference pixel p used in calculating the pixel value Js is expressed by $f(p-s) \cdot g(I_p-L_s)/k(s)$ and set based on a difference Ip−Ls between the pixel value Ip of each reference pixel and the pixel value Ls of the input image corresponding to the target pixel s and a distance ||p−s|| between the target pixel s and each reference pixel p.

FIG. 4 is a functional block diagram of the edge-preserving enlarging unit 32. An enlarging unit 40 (enlarging unit) enlarges the reduced smoothed image I to an image of the size of the luminance image L before the reduction.

A first calculating unit 41 (first calculating means) calculates the distances ||p−s|| between the target pixel (pixel to be interpolated) and the reference pixels p in the reduced smoothed image I enlarged before the interpolation, and calculates the first function $f$ from the distances ||p−s||. The reference pixels p are successively selected from an enlarged group of pixels (range $\Omega 1$) of 4×4 pixels of the reduced smoothed image I. Note that, in this embodiment, the first function $f$ is a broken line approximation function (solid line) obtained by approximating a one-sided Gaussian function curve (dotted line) by a broken line bent at two points. In this way, a processing of calculating the first function $f$ can be speeded up as compared with the case of using a one-sided Gaussian function.

A second calculating unit 42 (second calculating unit) calculates pixel value differences |Ip−Ls| between the pixel values Ip of the reference pixels p of the reduced smoothed image I enlarged before the interpolation and the pixel value Ls of the pixel corresponding to the position of the target pixel s in the luminance image L, and calculates the second function g from the pixel value differences |Ip−Ls|. Note that, in this embodiment, the second function g is a broken line approximation function (solid line) obtained by approximating a one-sided Gaussian function curve (dotted line) by a broken line bent at two points. In this way, a processing of calculating the second function g can be drastically speeded up as compared with the case of using a one-sided Gaussian function.

A first multiplying unit 43 (first multiplying means) calculates a product $f \cdot g$ by multiplying the first function $f$ and the second function g. A second multiplying unit 44 (second multiplying means) calculates a product $f \cdot g \cdot I_p$ by multiplying the product $f \cdot g$ by the pixel value Ip.

A first totaling unit 45 (first totaling unit) calculates $\Sigma f \cdot g$ (=k(s)) by totaling $f \cdot g$ for all the reference pixels p of the range $\Omega 1$. A second totaling unit 46 (second totaling unit) calculates $\Sigma f \cdot g \cdot I_p$ by totaling $f \cdot g \cdot I_p$ for all the reference pixels p of the range $\Omega 1$. A pixel value calculating unit 47 (pixel value calculating unit) calculates the pixel value Js of the enlarged image J by dividing Σƒ·g·Ip by k(s). The edge-preserving enlarging unit 32 obtains the enlarged image J by successively changing the target pixels s to be interpolated.

Note that the luminance image generating unit 10 is not necessary if the image processing device 1 performs the gradation correction processing and the texture correction processing for an input single-color (black-and-white) image.

Next, functions and effects according to this embodiment are described. The image processing device 1 according to this embodiment includes the reduced image smoothing unit 31 for performing the smoothing processing on the reduced image M generated by the reducing unit 30 with the edges preserved. The image processing device 1 further includes the edge-preserving enlarging unit 32 for generating the image J by enlarging the image I generated by the reduced image smoothing unit 31 with the edges preserved. The edge-preserving enlarging unit 32 performs the filtering processing associated with the pixel interpolation in enlarging the image I generated by the reduced image smoothing unit 31. Further, the edge-preserving enlarging unit 32 determines the pixel value Js of the target pixel s for the filtering processing based on weighted addition (Equation (3A)) of the pixel values of the respective reference pixels. The edge-preserving enlarging unit sets the weighting coefficients ƒ(p−s)·g(Ip−Ls)/k(s) corresponding to the pixel values Ip of the respective reference pixels p, based on the differences (Ip−Ls) between the pixel value Ls of the input image corresponding to the target pixel s and the pixel values Ip of the respective reference pixels and the distances ∥p−s∥ between the target pixel s and the respective reference pixels p.

In this way, such an illumination component image J not to cause a halo artifact in a gradation correction result can be generated as an output of the edge-preserving enlarging unit 32 with a small computation amount. In this embodiment, the computation amount to generate the illumination component image is reduced as compared to the technology of the fast bilateral filtering and a computing speed of the entire correction processing is improved to about 4.6-fold. A circuit size of the image processing device also becomes smaller as compared to the technology of the fast bilateral filtering.

Second Embodiment

In a second embodiment, the configuration of the edge-preserving enlarging unit of the edge-preserving smoothing unit 20 differs from the first embodiment. The other configuration is the same as in the first embodiment.

Figure 5:
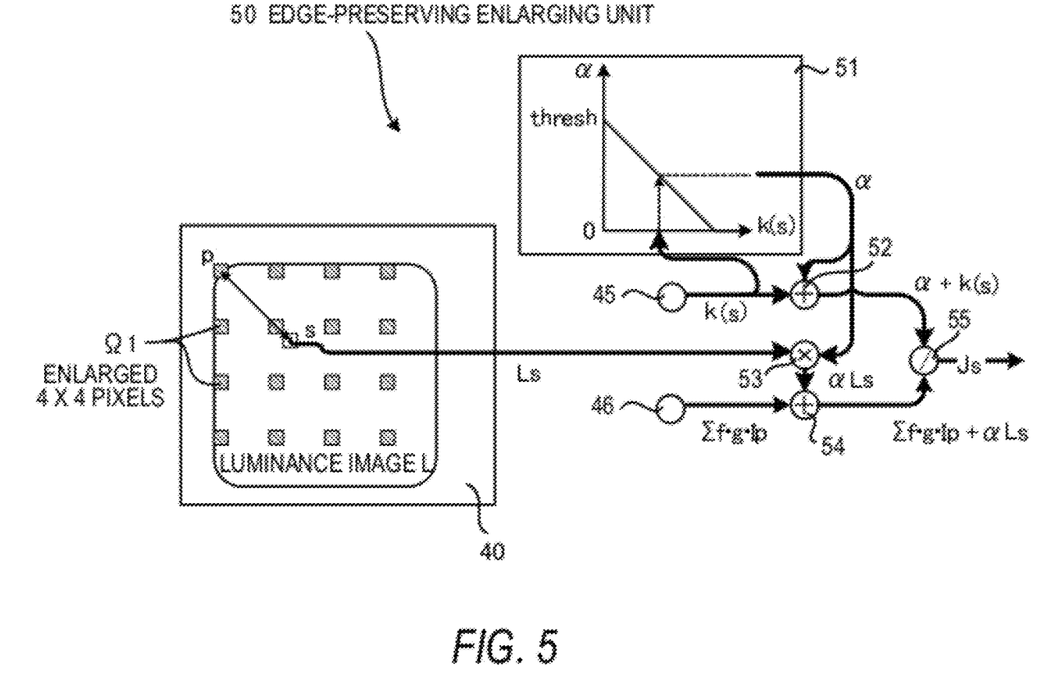
FIG. 5 is a functional block diagram of an edge-preserving enlarging unit according to a second embodiment.

In the second embodiment, an edge-preserving enlarging unit 50 performs an enlargement processing with edges preserved using interpolation expressed by Equations (4A), (4B), and calculates pixel values Js of an enlarged image J.

$$J_s = \frac{1}{\alpha + k(s)} \left( \sum_{p \in \Omega'} (I_p f(p-s) g(I_p - L_s)) + \alpha L_s \right) \quad (4A)$$

$$\alpha = \begin{cases} \text{thresh} - k(s) & \ldots \text{thresh} - k(s) > 0 \\ 0 & \ldots \text{otherwise} \end{cases} \quad (4B)$$

A parameter α increases as a total value k(s) of coefficients decreases. For example, if the total value k(s) is smaller than a threshold value thresh, the parameter α is a difference between the threshold value thresh and the total value k(s). The parameter α is zero if the total value k(s) is larger than the threshold value thresh. By a term αLs, pixel values Ls of pixels of an input luminance image L are mixed to a larger extent into the pixel values Js of the enlarged image J as the total value k(s) of the coefficients decreases.

FIG. 5 is a functional block diagram of the edge-preserving enlarging unit 50 (edge-preserving enlarging means) of the second embodiment. The edge-preserving enlarging unit 50 of the second embodiment includes a parameter calculating unit 51 (parameter calculating means), a first adding unit 52 (first adding means), a third multiplying unit 53 (third multiplying means), a second adding unit 54 (second adding means) and a pixel value calculating unit 55 (pixel value calculating means) in addition to the respective units 40 to 46 of the edge-preserving enlarging unit 32 of the first embodiment.

The parameter calculating unit 51 calculates the parameter α based on the difference between the threshold value thresh and the total value k(s) calculated by the first totaling unit 45. The first adding unit 52 calculates a sum α+k(s) of the total value k(s) and the parameter α. The third multiplying unit 53 calculates a product αLs of the parameter α and the pixel value Ls. The second adding unit 54 calculates a sum (Σƒ·g·Ip+αLs) of the product αLs and Σƒ·g·Ip calculated by the second totaling unit 46. The pixel value calculating unit 55 calculates the pixel value Js of the enlarged image J by dividing the sum (Σƒ·g·Ip+αLs) by the sum α+k(s).

Figure 6A:
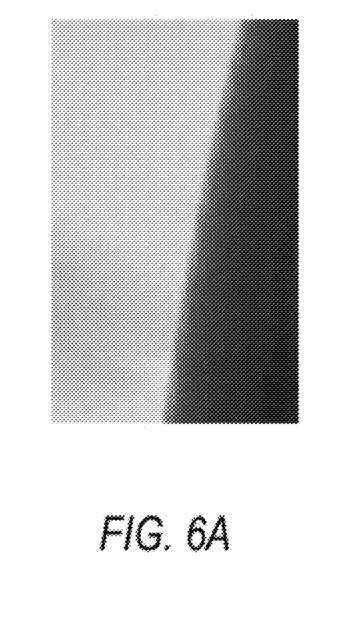
FIG. 6A is a view showing an image in which shading is repeated along an edge part.

Next, functions and effects of the second embodiment are described. When the gradation correcting unit 21 performs a gradation correction processing using an edge-preserving smoothed image (enlarged image J) generated by the edge-preserving smoothing unit 20 of the first embodiment, there is a possibility that, in an edge part with a somewhat oblique and large dark/bright difference, shading is repeated along the edge part in a gradation-corrected image as shown in FIG. 6A. This is because the number of reference pixels p having small differences between the pixel values Ls of the luminance image L and the pixel values Ip of the reference pixels decreases in the edge part. That is, the cause of this is that there are no changes in the coefficients g(Ip−Ls) among the respective pixels since all the coefficients g(Ip−Ls) on the pixel values become smaller in the same way in the interpolation (Equation (3A)) in the enlargement processing.

Figure 6B:
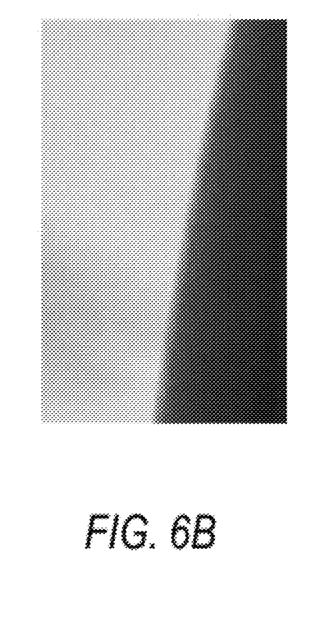
FIG. 6B is a view showing an image in which shading is not repeated along an edge part by the second embodiment.

Accordingly, in the second embodiment, the edge-preserving enlarging unit 50 sets weighting coefficients ƒ(p−s)·g(Ip−Ls)/(α+k(s)) in proportion to coefficient values ƒ·g determined according to pixel value differences (Ip−Ls) between the pixel values Ip of the respective reference pixels and the pixel value Ls of the input image corresponding to the target pixel s. Further, the edge-preserving enlarging unit 50 mixes the pixel value Ls of the pixel corresponding to the target pixel s in the input image to a larger extent into the pixel value Js of the target pixel s as the total value k(s) of the coefficient values ƒ·g decreases. In this way, repeated shading along the edge part can be prevented as shown in FIG. 6B.

Third Embodiment

In a third embodiment, the configuration of a reduced image smoothing unit 31 of an edge-preserving smoothing unit 20 differs from the first embodiment. The other configuration is the same as in the first embodiment.

In the third embodiment, a computation amount of the edge-preserving smoothing unit 20 is reduced more than in the first embodiment. The reduced image smoothing unit 31 is capable of performing a processing using a bilateral filter as shown in Equations (5A), (5B).

$$I_s = \frac{1}{k(s)} \sum_{p \in \Omega} f(p-s)g(M_p - M_s)M_p \quad (5A)$$

$$k(s) = \sum_{p \in \Omega} f(p-s)g(M_p - M_s) \quad (5B)$$

Here, s denotes a target pixel (i.e. pixel to be filtered) and $\Omega$ denotes a filter range. k(s) denotes a normalized value of the filtering result at the target pixel s, i.e. a total value of coefficients $f \cdot g$ on respective reference pixels p in the filter range. Further, a first function f and a second function g are functions for calculating coefficient values on the respective reference pixels p. The first function f gives the coefficient value dependent on a distance $\|p-s\|$ between the target pixel s and the reference pixel p, and the second function g gives a coefficient value dependent on a difference between a pixel value Ms of the target pixel s of a reduced image M and a pixel value Mp of the reference pixel p of the reduced image M. The first function f and the second function g are normally Gaussian functions respectively having different standard deviations σ and differ from those used in an edge-preserving enlarging unit 32.

However, less multiplication is preferable since computation cost is higher as compared to addition and the like. Thus, the reduced image smoothing unit 31 of the edge-preserving smoothing unit 20 performs edge-preserving smoothing on the reduced image M by omitting multiplication of coefficient values f dependent on the distances $\|p-s\|$.

If application of a simple smoothing filter which does not use the differences between pixel values is assumed, a coefficient f of the simple smoothing filter for each reference pixel is a function f(r) determined by a distance r between the target pixel s and the reference pixel p. Here, the total of the coefficients of the reference pixels p at the distance r from the target pixel s is $2\pi r \cdot f(r)$ (i.e. in proportion to $r \cdot f(r)$).

Meanwhile, if density per unit area of the reference pixels p on a circumference centered on the target pixel s is adjusted to be f(r) according to the distance r, the total of the coefficients of the reference pixels p on the circumference at the distance (radius) r is in proportion to $r \cdot f(r)$. Such an adjustment of the density of the reference pixels p is thought to have the same effect as multiplication by the coefficients f(r) determined by the distance r from the target pixel s.

To apply the bilateral filter in the third embodiment, the density of the reference pixels p is made uneven according to the distance r from the target pixel s to make reference uneven, instead of using the coefficients f based on the distance from the target pixel s. That is, multiplication of the coefficient values f is omitted. Calculations of Equations (6A), (6B) may be performed only for the coefficients g based on the pixel value differences.

$$I_s = \frac{1}{k(s)} \sum_{p \in \Omega 2} g(M_p - M_s)M_p \quad (6A)$$

$$k(s) = \sum_{p \in \Omega 2} g(M_p - M_s) \quad (6B)$$

Figure 7:
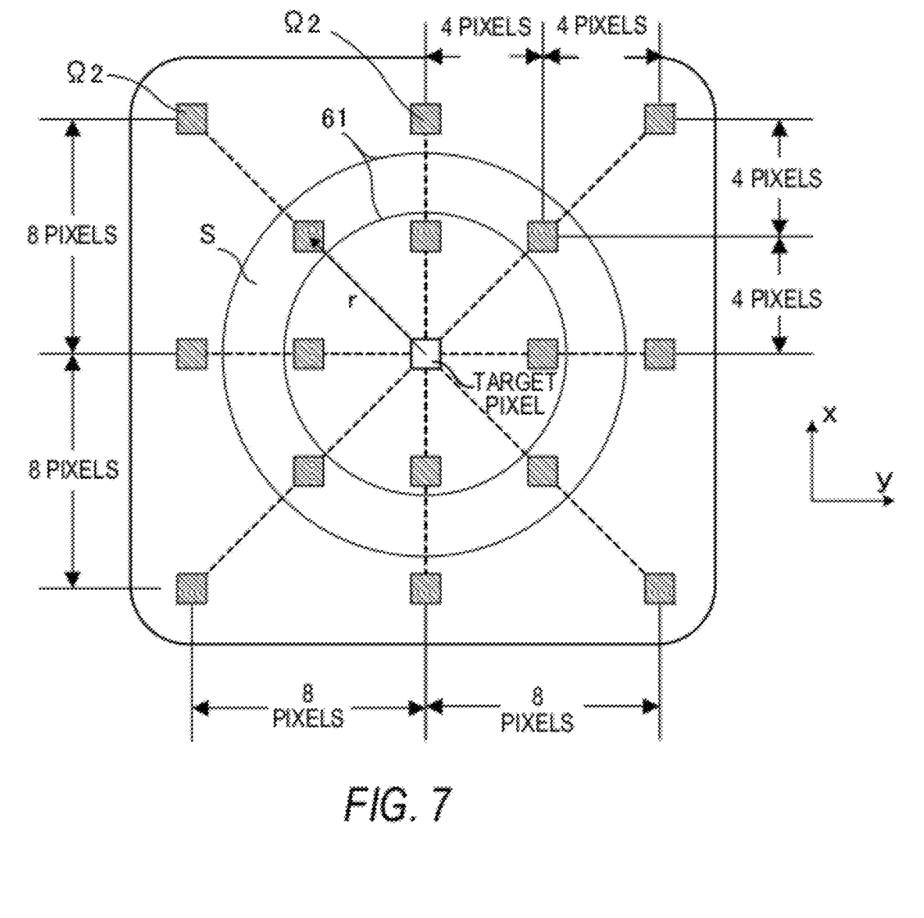
FIG. 7 is a diagram showing a position range of reference pixels by a third embodiment.
Figure 8:
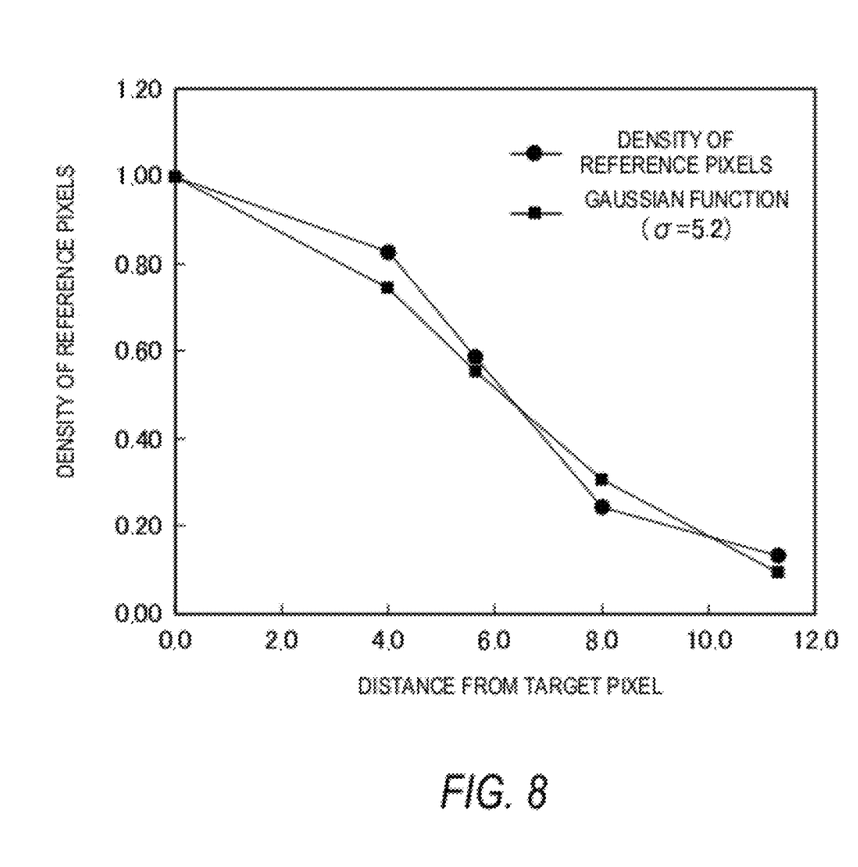
FIG. 8 is a graph showing a relationship between distance from a target pixel and density of reference pixels in the third embodiment.

For example, as shown by hatching in FIG. 7, a position range 122 (filter range) of the reference pixels p is composed of pixel positions only in eight directions spaced apart by 45° about the target pixel s and at a four-pixel interval in x, y directions if a reference range is a range of ±eight pixels in horizontal and vertical directions. In this case, a relationship between the distance r from the target pixel s and the density of the reference pixels p is approximated to a Gaussian function as shown in FIG. 8. Thus, setting of the position range $\Omega 2$ as in FIG. 7 is equivalent to setting of f as a Gaussian function. For example, in FIG. 7, the density of the reference pixels p at the distance r can be calculated by dividing the number of the reference pixels at the distance r located between adjacent intermediate lines 61 by an area S between the intermediate lines 61. The respective intermediate lines 61 are located between concentric circles passing through the pixels in the position range $\Omega 2$. By performing the edge-preserving smoothing processing of the third embodiment on an actual image, effects similar to those of the first embodiment are achieved.

According to the third embodiment, the reduced image smoothing unit 31 changes the density of the reference pixels p around the target pixel (pixel to be filtered) s of the reduced image M according to the distance r ($=\|p-s\|$) from the target pixel s. The reduced image smoothing unit 31 sets weighting coefficients g(Mp-Ms)/k(s) based on differences Mp-Ms between the pixel value of the target pixel (pixel to be processed) of the reduced image M and the pixel values of the respective reference pixels. Thus, besides being able to reduce multiplication, the number of the reference pixels can be reduced. Therefore, a computation amount to obtain an illumination component (e.g. image I from the reduced image smoothing unit 31) can be further reduced.

Other Embodiment

In the above description of the embodiments, it is assumed that the processing performed by the image processing device is hardware processing, but this invention need not be limited to such a constitution. For example, a constitution in which the processing is performed by software may be employed. In this case, the image processing device corresponds to a computer which includes a CPU, a main storage device such as a RAM, and a non-transitory computer-readable storage device (or storage medium) storing a program for realizing all or a part of the processing described above. Here, the program is referred to as an image processing program. By having the CPU read the image processing program stored on the storage device and execute information processing/calculation processing, similar processing to that of the image processing device described above is realized.

Here, a non-transitory computer-readable storage device (or storage medium) denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

Figure 9A:
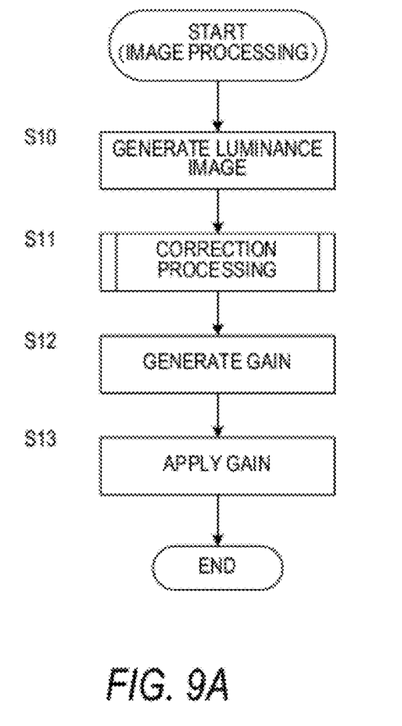
FIG. 9A is a flow chart showing a main routine of an image processing program.
Figure 9B:
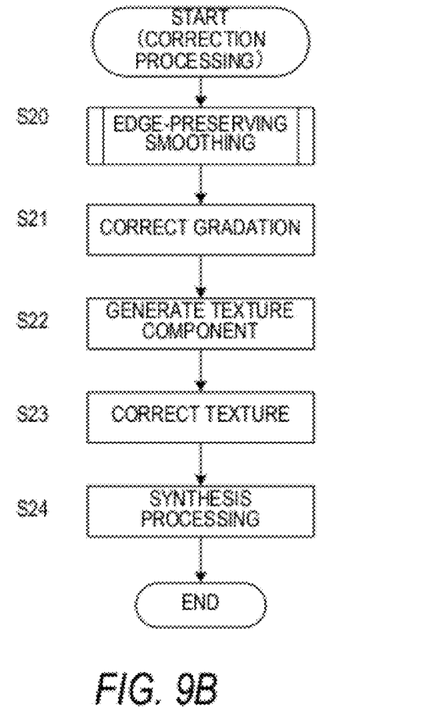
FIG. 9B is a flow chart showing a subroutine of a correction processing.
Figure 9C:
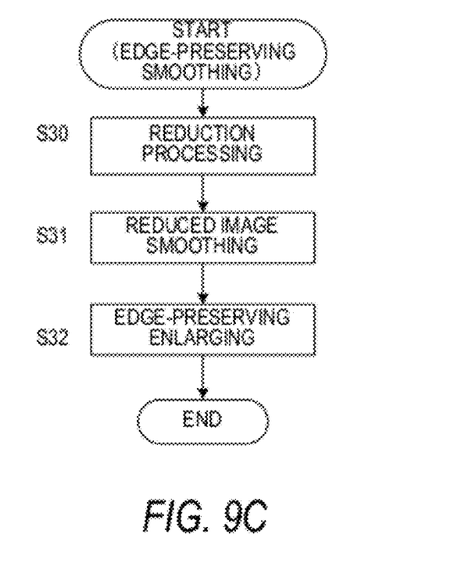
FIG. 9C is a flow chart showing a subroutine of an edge-preserving smoothing processing.

FIGS. 9A to 9C show a program executed by the image processing device (computer). FIG. 9A shows a main routine of an image processing. FIG. 9B shows a subroutine of a correction processing. FIG. 9C shows a subroutine of an edge-preserving smoothing processing. Processings performed in Steps S10 to S13 of FIG. 9A respectively correspond to the processings performed by the respective units 10 to 13 of FIG. 1. Processings performed in Steps S20 to S24 of FIG. 9B respectively correspond to the processings performed by the respective units 20 to 24 of FIG. 2. Processings performed in Steps S30 to S32 of FIG. 9C respectively correspond to the processings performed by the respective units 30 to 32 of FIG. 3.

It is obvious that the present invention is not limited to the above embodiments and can be variously modified in the scope of a technical idea thereof.

This application claims priority based on JP2010-230949, filed with the Japan Patent Office on Oct. 13, 2010, the entire contents of which are incorporated into this specification by reference.

What is claimed is:

1. An image processing device for performing edge-preserving smoothing, the image processing device comprising:
a reducing unit which reduces an input image;
a reduced image smoothing unit which performs a smoothing processing on a reduced image generated by the reducing unit with edges preserved; and
an edge-preserving enlarging unit which enlarges an image generated by the reduced image smoothing unit with the edges preserved,
wherein the edge-preserving enlarging unit performs a filtering processing after enlargement, by determining a pixel value of a target pixel of an enlarged image for the filtering processing based on weighted addition of pixel values of respective reference pixels of the enlarged image; and
wherein the edge-preserving enlarging unit sets weighting coefficients for the pixel values of the respective reference pixels of the enlarged image: (i) based on differences between a pixel value of the input image corresponding to the target pixel of the enlarged image and the pixel values of the respective reference pixels of the enlarged image, and (ii) based on distances between the target pixel of the enlarged image and the respective reference pixels of the enlarged image.

2. The image processing device according to claim 1, wherein the edge-preserving enlarging unit:
sets the weighting coefficients in proportion to coefficient values determined according to the differences between the pixel value of the input image corresponding to the target pixel of the enlarged image and the pixel values of the respective reference pixels of the enlarged image; and
mixes the pixel value of a pixel in the input image corresponding to the target pixel of the enlarged image to a larger extent into the pixel value of the target pixel of the enlarged image as a total of the coefficient values decreases.

3. The image processing device according to claim 1, wherein the reduced image smoothing unit:
performs a filtering processing on the reduced image based on weighted addition and changes a density of reference pixels around a pixel to be filtered according to a distance from the pixel to be filtered; and
sets weighting coefficients based on differences between a pixel value of the pixel to be filtered of the reduced image and pixel values of respective reference pixels of the reduced image.

4. An electronic apparatus, comprising the image processing device according to claim 1.

5. An image processing method for performing edge-preserving smoothing, the image processing method comprising:
a reducing step of reducing an input image;
a reduced image smoothing step of performing a smoothing processing on a reduced image generated in the reducing step with edges preserved; and
an edge-preserving enlarging step of enlarging an image generated in the reduced image smoothing step with the edges preserved,
wherein the edge-preserving enlarging step includes performing a filtering processing after enlargement, by determining a pixel value of a target pixel of an enlarged image for the filtering processing based on weighted addition of pixel values of respective reference pixels of the enlarged image; and
wherein, in the weighted addition, weighting coefficients are set for the pixel values of the respective reference pixels of the enlarged image: (i) based on differences between a pixel value of the input image corresponding to the target pixel of the enlarged image and the pixel values of the respective reference pixels of the enlarged image, and (ii) based on distances between the target pixel of the enlarged image and the respective reference pixels of the enlarged image.

6. A non-transitory computer-readable storage device storing an image processing program for performing edge-preserving smoothing by a computer, the image processing program causing the computer to perform:
a reducing procedure for reducing an input image;
a reduced image smoothing procedure for performing a smoothing processing on a reduced image generated by the reducing procedure with edges preserved; and
an edge-preserving enlarging procedure for enlarging an image generated by the reduced image smoothing procedure with the edges preserved,
wherein the edge-preserving enlarging procedure includes performing a filtering processing after enlargement, by determining a pixel value of a target pixel of an enlarged image for the filtering processing based on weighted addition of pixel values of respective reference pixels of the enlarged image; and
wherein, in the weighted addition, weighting coefficients are set for the pixel values of the respective reference pixels of the enlarged image: (i) based on differences between a pixel value of the input image corresponding to the target pixel of the enlarged image and the pixel values of the respective reference pixels of the enlarged image, and (ii) based on distances between the target pixel of the enlarged image and the respective reference pixels of the enlarged image.

7. An image processing device for performing edge-preserving smoothing, the image processing device comprising:
reducing means for reducing an input image;
reduced image smoothing means for performing a smoothing processing on a reduced image generated by the reducing means with edges preserved; and
edge-preserving enlarging means for enlarging an image generated by the reduced image smoothing means with the edges preserved,
wherein the edge-preserving enlarging means performs a filtering processing after enlargement, by determining a pixel value of a target pixel of an enlarged image for the filtering processing based on weighted addition of pixel values of respective reference pixels of the enlarged image; and
wherein the edge-preserving enlarging means sets weighting coefficients for the pixel values of the respective reference pixels of the enlarged image: (i) based on differences between a pixel value of the input image corresponding to the target pixel of the enlarged image and the pixel values of the respective reference pixels of the enlarged image, and (ii) based on distances between the target pixel of the enlarged image and the respective reference pixels of the enlarged image.

8. The image processing device according to claim 7, wherein the edge-preserving enlarging means:

sets the weighting coefficients in proportion to coefficient values determined according to the differences between the pixel value of the input image corresponding to the target pixel of the enlarged image and the pixel values of the respective reference pixels of the enlarged image; and mixes the pixel value of a pixel in the input image corresponding to the target pixel of the enlarged image to a larger extent into the pixel value of the target pixel of the enlarged image as a total of the coefficient values decreases.

9. The image processing device according to claim 7, wherein the reduced image smoothing means:

performs a filtering processing on the reduced image based on weighted addition and changes a density of reference pixels around a pixel to be filtered according to a distance from the pixel to be filtered; and sets weighting coefficients based on differences between a pixel value of the pixel to be filtered of the reduced image and pixel values of respective reference pixels of the reduced image.

10. An electronic apparatus, comprising the image processing device according to claim 7.

* * * * *